United States Patent [19]
Trepka et al.

[11] Patent Number: 5,910,546
[45] Date of Patent: Jun. 8, 1999

[54] TAPERED BLOCK COPOLYMERS OF MONIVINYLARENES AND CONJUGATED DIENES

[75] Inventors: William J. Trepka; George A. Moczygemba; Nathan E. Stacy; Ralph C. Farrar, Jr., all of Bartlesville, Okla.

[73] Assignee: Phillips Petroleum Company, Bartlesville, Okla.

[21] Appl. No.: 08/963,964

[22] Filed: Nov. 4, 1997

Related U.S. Application Data

[63] Continuation of application No. 08/605,659, Feb. 22, 1996, abandoned, which is a continuation of application No. 08/153,408, Nov. 15, 1993, abandoned.

[51] Int. Cl.$^6$ .................................................. C08F 297/04
[52] U.S. Cl. ..................... 525/314; 525/316; 525/250; 525/271
[58] Field of Search .................................. 525/314, 250, 525/271, 316

[56] References Cited

U.S. PATENT DOCUMENTS

| | | | |
|---|---|---|---|
| 4,248,981 | 2/1981 | Milkovich | 525/271 |
| 4,248,982 | 2/1981 | Bi | 525/271 |
| 4,335,221 | 6/1982 | Gerberdino | 525/89 |
| 4,704,434 | 11/1987 | Ketchen et al. | 525/206 |
| 4,925,899 | 5/1990 | Rendina | 525/314 |
| 5,130,377 | 7/1992 | Trepka | 525/314 |
| 5,227,419 | 7/1993 | Moxzygemba et al. | 524/524 |
| 5,256,736 | 10/1993 | Trepka | 525/314 |
| 5,290,875 | 3/1994 | Moczygemba | 525/314 |
| 5,319,033 | 6/1994 | Trepka | 525/314 |
| 5,436,298 | 7/1995 | Moczygemba et al. | 525/314 |
| 5,705,569 | 1/1998 | Moczygemba et al. | 525/314 |

*Primary Examiner*—Jeffrey Mullis
*Attorney, Agent, or Firm*—Carl D. Corvin

[57] ABSTRACT

A method for preparing tapered block copolymers which are particularly useful for blend components in blends with polymers of styrene. In the first embodiment of this invention the copolymers are prepared in a polymerization process by sequentially charging: (1) an initiator and monovinylaromatic monomers in the presence of a randomizer; (2) an initiator and monovinylaromatic monomers; (3) a mixture of monovinylaromatic and conjugated diene monomers; and (4) a coupling agent; to produce a polymodal tapered block copolymer. In a second embodiment of the invention tapered block copolymers are prepared in a polymerization process by sequentially charging: (1) an initiator and monovinylaromatic monomers in the presence of a randomizer; (2) an initiator and monovinylaromatic monomers; (3) a mixture of monovinylaromatic and conjugated diene monomers; (4) a mixture of monovinylaromatic and conjugated diene monomers; and (5) a coupling agent; to produce a polymodal tapered block copolymer. The invention copolymers and blends of the invention copolymers with polymers of styrene are particularly useful for applications such as packaging and food or drink containers which require transparency, low blueness, colorlessness, good impact strength and ductility.

21 Claims, No Drawings

TAPERED BLOCK COPOLYMERS OF MONIVINYLARENES AND CONJUGATED DIENES

This application is a File Wrapper Continuation of application Ser. No. 08/605,659, filed Feb. 22, 1996, now abandoned, which is a File Wrapper Continuation of application Ser. No. 08/153,408, filed Nov. 15, 1993, now abandoned.

FIELD OF THE INVENTION

This invention relates to tapered block copolymers of monovinylarenes and conjugated dienes and methods of preparation of these tapered block copolymers.

BACKGROUND OF THE INVENTION

There has developed in the polymer field, and especially in the packaging and related industries, a need for thermoplastic polymers that can be formed into colorless, transparent articles having good impact strength and ductility. There are needs for polymers which are useful as single components as well as for use in blends with other commonly used polymers to make articles with improved properties. The polymers satisfying these needs should be suitable for use with conventional extrusion, injection and blow molding equipment and also suitable for use in other methods of forming plastics into containers, tubes, films, fibers, and the like. Polystyrene, high impact polystyrene, branched block copolymers, and the like have been developed to meet these criteria with various degrees of satisfaction.

Much effort has been directed to the preparation of substantially transparent block copolymer resins with a variety of block structures produced by a variety of monomer addition sequences and a variety of coupling agents. Desirable properties and an economic advantage can be obtained by blending some monovinylaromatic-conjugated diene copolymers with polystryene polymers. However, because blueness of blends of monovinylaromatic-conjugated diene copolymers with polystyrene polymers cannot be predicted by rule of mixtures behaviors, getting a desirable combination of properties can be a complicated task. Sometimes relatively colorless monovinylaromatic-conjugated diene copolymers give blends with high blueness when blended with colorless general purpose polystyrene.

Blueness of articles formed from various copolymers and blends of copolymers with other polymers is a longstanding problem in applications where colorless materials which also have good impact strength and ductility are desirable. Specific examples include materials for water and food containers.

SUMMARY OF THE INVENTION

It is an object of this invention to provide novel resinous tapered block copolymers of vinyl-substituted aromatic hydrocarbons and conjugated dienes from which can be made articles with low blueness and acceptable impact strength and ductility.

It is another object of this invention to provide novel resinous tapered block copolymers of vinyl-substituted aromatic hydrocarbons and conjugated dienes suitable for use in blends with polymers of styrene, particularly blends from which can be made articles that exhibit low blueness and acceptable impact strength and/or ductility. Further, it is an object to provide novel resinous tapered block copolymers of vinyl-substituted aromatic hydrocarbons and conjugated dienes which can be used in smaller amounts than some of the other commonly used resinous polymodal monovinyl substituted aromatic-conjugated diene block copolymers in blends with polymers of styrene to achieve similarly low blueness levels and good impact strength and/or ductility in articles made from the blends.

A further object of this invention is to provide novel processes for making resinous tapered block monovinylaromatic/conjugated diene copolymers, including copolymers suitable for use in blends.

In a first embodiment of the invention, copolymers are prepared under solution polymerization conditions in a reaction zone by:

(a) charging a monovinylaromatic monomer and an initiator in the presence of a randomizer and allowing polymerization to occur until essentially no free monomer is present; thereafter (b) charging an initiator and a monovinylaromatic monomer and allowing polymerization to occur until essentially no free monomer is present; thereafter (c) charging a mixture of monovinylaromatic monomer and conjugated diene monomer and allowing polymerization to occur until essentially no free monomer is present; and thereafter (d) charging the reaction mixture with a coupling agent.

In a second embodiment of the invention, copolymers are prepared in the same manner as those of the first embodiment, except that additionally, after step (c) and preceeding step (d), a second separate charge of a mixture of monovinylaromatic monomer and conjugated diene monomer is made and allowed to polymerize until essentially no free monomer is present before charging the reaction mixture with a coupling agent.

DETAILED DESCRIPTION OF THE INVENTION

We have discovered novel monovinylaromatic/ conjugated diene tapered block copolymers which can be used neat or blended with polymers of styrene to produce resins which can be formed into articles with low blueness and advantageous impact properties and/or ductility.

The polymers of this invention are characterized as resinous non-rubbery block copolymers of at least one conjugated diene with at least one monovinylarene, having at least one random-tapered block and are prepared so that, when the choice of coupling agent permits, at least a portion of the final product is of a branched, coupled character.

The polymers prepared according to this invention contain from about 55 to about 95, preferably from about 60 to about 90, more preferably from about 65 to about 85, weight percent of copolymerized monovinyl aromatic monomer based on the weight of total monomers employed. Correspondingly, the inventive copolymers contain from about 45 to about 5, preferably from about 40 to about 10, and more preferably from about 35 to about 15 weight percent copolymerized conjugated diene monomer based on the total w eight of monomers in the copolymer.

The coupled portions of the resinous polymodal block copolymers of this invention have terminal polymonovinylarene blocks on the extending arms of each linear or radial copolymer molecule, and further contain at least one internal tapered block of monovinylarene and conjugated diene. The resinous copolymeric polymodal products also contain portions of linear uncoupled block copolymers of poly (monovinylarene)-poly(conjugated diene); the linear uncoupled block copolymer content is considered to be an important portion of the resinous product with respect to its overall properties.

Components

The process of this invention can be carried out using as an initiator any of the organomonoalkali metal compounds of the formula RM wherein R is an alkyl, cycloalkyl or arylcarbanion containing 4 to 8 carbon atoms and M is an alkyl metal cation. Mixtures of organoalkali metal compounds can be used. The presently preferred initiators are alkylmonolithium compounds, especially n-butyllithium or sec-butyllithium.

The conjugated diene monomers which can be used contain 4 to 6 carbon atoms and include 1,3-butadiene, 2-methyl-1,3-butadiene, 2-ethyl-1,3-butadiene, 2,3-dimethyl-1,3-butadiene and 1,3-pentadiene and mixtures thereof. Each of the charges containing conjugated diene in the same sequence of charges may be the same, but is not necessarily the same, conjugated diene monomer or mixture of conjugated diene monomers. The presently preferred conjugated diene monomer is 1,3-butadiene.

The monovinylaromatic monomers which can be used contain 8 to 12 carbon atoms and include styrene, alpha-methylstyrene, 4-methylstyrene, 3-methylstyrene, 2-methylstyrene, 4-ethylstyrene, 3-ethylstyrene, 2-ethylstyrene, 4-tert-butylstyrene, 2,4-dimethylstyrene and condensed aromatics such as vinyl napthalene and mixtures thereof. Each of the charges containing monovinylaromatic monomer in the same sequence of charges may be the same, but is not necessarily the same, monovinylaromatic monomer or mixture of monovinylaromatic monomers. The presently preferred monovinylaromatic monomer is styrene.

Examples of polar compounds which can be advantageously employed as randomizers are ethers, thioethers (sulfides) and tertiary amines. It is usually preferred to use ethers and sulfides in which the radicals attached to the oxygen or sulfur atoms are hydrocarbon radicals. Specific examples of such polar materials include dimethyl ether, diethyl ether, ethyl methyl ether, ethyl propyl ether, di-n-propyl ether, di-n-octyl ether, anisole, dioxane, 1,2-dimethoxyethane, dibenzyl ether, diphenyl ether, 1,2-dimethoxybenzene, tetramethylene oxide (tetrahydrofuran), dimethyl sulfide, diethyl sulfide, di-n-propyl sulfide, di-n-butyl sulfide, methyl ethyl sulfide, dimethylethylamine, tri-n-ethylamine, tri-n-propylamine, tri-n-butylamine, trimethylamine, triethylamine, tetramethylethylenediamine, tetraethylethylenediamine, N,N-di-methylaniline, N-methyl-N-ethylaniline, N-methylmorpholine, and the like. It is to be understood also that mixtures of these polar compounds can be employed in the practice of the present invention. The polar compounds are generally used in admixture with the hydrocarbon diluent. Presently preferred are either tetrahydrofuran or diethyl ether.

Among the suitable coupling agents are the di- or multi-vinylaromatic compounds, di- or multiepoxides, di- or multiisocyanates, di- or multiimines, di- or multialdehydes, di- or multiketones, alkoxytin compounds, di- or multihalides, particularly silicon halides and halosilanes, mono-, di-, or multianhydrides, mono-, di-, or multiesters, preferably the esters of monoalcohols with polycarboxylic acids, diesters which are esters of monohydric alcohols with dicarboxylic acids, lactones, monobasic acids with polyalcohols such as glycerol, and the like, including compounds containing two or more groups and mixtures of two or more compounds.

Examples of suitable vinylaromatic coupling agents include, but are not limited to, divinylbenzene, 1,2,4-trivinylbenzene, 1,3-divinylnaphthalene, 1,3,5-trivinylnaphthalene, 2,4-divinylbiphenyl, p-diisopropenylbenzene, and the like. Of these, the divinylaromatic hydrocarbons are preferred, particularly divinylbenzene in either its ortho, meta, or para isomer. Commercial divinylbenzene which is a mixture of the three isomers and other compounds is satisfactory.

Epoxidized hydrocarbon polymers such as epoxidized liquid polybutadiene and epoxy compounds such as 1,2; 5,6; 9,10-triepoxydecane, and the like, can be used as coupling agents.

Organoalkyl phosphites and arylalkyl phosphites are considered useful as coupling agents in this invention.

Examples of suitable multiisocyanate coupling agents include benzene-1,2,4-triisocyanate, naphthalene-1,2,5,7-tetraisocyanate, and the like. Commercially available products known as PAPI-1, a polyarylpolyisocyanate having an average of 3 isocyanate groups per molecule and an average molecular weight of about 380 are suitable.

The multiimines, also known as multiaziridinyl compounds, such as those containing 3 or more aziridine rings per molecule, are useful as coupling agents. Other compounds useful as coupling agents include tetravinyl silane, trivinyl phosphine, the triaziridinyl phosphine oxides or sulfides such as tri(1-aziridinyl)phosphine oxide, tri(2-methyl-1-aziridinyl)phosphine oxide, tri(2-ethyl-3-decyl-1-aziridinyl)phosphine sulfide, and the like.

The multialdehyde coupling agents are represented by compounds such as 1,4,7-naphthalenetricarboxyaldehyde, 1,7,9-anthracenetricarboxyaldehyde, 1,3,5-pentanetricarboxyaldehyde, and similar multialdehyde-containing aliphatic and aromatic compounds. The multiketones are represented by compounds such as 1,4,9,10-anthracenetetrone, 2,3-diacetonylcyclohexanone, and the like. Examples of the multianhydrides include pyromellitic dianhydride, styrene-maleic anhydride copolymers, and the like. Examples of the multiesters include diethyladipate, triethylcitrate, 1,3,5-benzenetricarboxylic acid, triethyl ester, and the like.

Among the multihalide coupling agents are the silicon tetrahalides such as silicon tetrachloride, silicon tetrabromide, and silicon tetraiodide; the trihalosilanes such as trichlorosilane, trichloroethylsilane, tribromobenzylsilane, and the like; and the multihalogen-substituted hydrocarbons, such as 1,3,5-tri(bromomethyl) benzene, 2,5,6,9-tetrachloro-3,7-decadiene, and the like, in which the halogen is attached to a carbon atom which is alpha to an activating group such as an ether linkage, a carbonyl group, or a carbon-to-carbon double bond. Substituents inert with respect to lithium atoms in the terminally reactive polymer can also be present in the active halogen-containing compounds. Alternatively, other suitable reactive groups different from the halogens as described above can be present.

Other metal multihalides, particularly those of tin, lead, or germanium, can be employed as coupling and branching agents. Silicon or other metal multialkoxides, such as silicon tetraethoxide, are also suitable coupling agents.

Examples of compounds containing more than one type of functional group include 1,3-dichloro-2-propanone, 2,2-dibromo-3-decanone, 2,4-dibromo-3-pentanone, 1,2; 4,5-diepoxy-3-pentanone, 1,2; 4,5-diepoxy-3-hexanone, 1,2; 11,12-diepoxy-8-pentadecanone, 1,2; 18,19-diepoxy-7,14-eicosanedione, and the like.

Useful multifunctional coupling agents include epoxidized vegetable oils such as epoxidized soybean oil, epoxidized linseed oil and the like or mixtures thereof.

The presently preferred coupling agent is epoxidized vegetable oil. Presently preferred is epoxidized soybean oil.

Process

The unique polymodal tapered block character of the polymer and low blueness and good impact strength and/or ductility of articles made from the polymer or blends of the polymer of the first embodiment of this invention are produced by the unique sequence of an initial charge of monovinylaromatic monomer and initiator and a subsequent addition of a second charge of initiator and monovinylaromatic monomer, followed by a separate charge of a mixture of monovinylaromatic monomer and conjugated diene, and a subsequent coupling step.

The unique polymodal tapered block character of the polymer and low blueness and good impact strength and/or ductility of articles made from the polymer or blends of the polymer of the second embodiment of this invention are produced by the process of the first embodiment with the addition of a second separate charge of a mixture of monovinyl aromatic and conjugated diene monomers next preceeding the coupling step.

In each of the two embodiments of this invention the first initiator charge produces active living monovinyl aromatic component polymer blocks with alkali metal atoms (from the initiator) on at least one end to form active reaction sites. Each subsequent monomer charge adds monomer to the living polymer chain at the alkali metal reaction site. At each stage of charging, polymerization is allowed to continue until essentially no free monomer is present.

With each subsequent charge which includes initiator a new polymer-alkali metal species will be produced, and each subsequent monomer charge has an opportunity for polymerization of part of the charge with each of the existing polymer-alkali metal species. Each of the active living polymer chains will have terminal monovinyl aromatic blocks on both ends after polymerization of each monomer charge containing monovinyl aromatic. Even when mixtures of monovinyl aromatic monomer and conjugated diene are charged, the polymer chains will have terminal monovinyl aromatic blocks on both ends. After virtually complete polymerization of the final monomer charge, the active living linear block copolymers are charged with a difunctional or polyfunctional coupling agent to allow coupling of each of the living species with each of the other living species or with others of the same living species to form the desired polymodal tapered block copolymers. If the coupling agent is not 100 percent efficient and/or if less or more than a stoichiometric amount of coupling agent is used, there can be some uncoupled terminated polymer chains of each of the species in the final reaction mixture.

Use of difunctional coupling agents will produce predominantly linear polymer chains. Depending upon functionality, various degrees and kinds of branching may be accomplished with polyfunctional coupling agents. Variations in the amount of a particular polyfunctional coupling agent also can be used to manipulate the degree and kind of branching at the coupling sites.

The charging sequences of this invention and the resulting polymers at each stage are exemplified using a selected monovinylaromatic monomer, conjugated diene and polyfunctional coupling agent in the following Tables 1 and 2.

TABLE 1

Invention Charging Sequence
(First Embodiment)

| Charge | Contents of Charge | Resulting Polymer Chains |
|---|---|---|
| (a) | randomizer initiator$_1$ and styrene$_1$ | $S_1$—$Li_1$ |
| (b) | initiator$_2$ and styrene$_2$ | $S_1$—$S_2$—$Li_1$ $S_2$—$Li_2$ |
| (c) | butadiene$_1$ and styrene$_3$ | $S_1$—$S_2$—$B_1/S_3$—$Li_1$ $S_2$—$B_1/S_3$—$Li_2$ |
| (d) | coupling agent | polymodal tapered block copolymers with styrene terminal blocks | where S = styrene
B = butadiene
B/S = tapered block
Li = residue from a monoalkali metal initiator remaining on the end of the polymerization chain or reaction site prior to termination or coupling.
subscripts = designation of the numerical order in which that particular component was charged or formed.

TABLE 2

Invention Charging Sequence
(Second Embodiment)

| Charge | Contents of Charge | Resulting Polymer Chains |
|---|---|---|
| (a) | randomizer, initiator$_1$ and styrene$_1$ | $S_1$—$Li_1$ |
| (b) | initiator$_2$ and styrene$_2$ | $S_1$—$S_2$—$Li_1$ $S_2$—$Li_2$ |
| (c) | butadiene$_1$ and styrene$_3$ | $S_1$—$S_2$—$B_1/S_3$—$Li_1$ $S_2$—$B_1/S_3$—$Li_2$ |
| (d) | butadiene$_2$ and styrene$_4$ | $S_1$—$S_2$—$B_1/S_3$—$B_2/S_4$—$Li_1$ $S_2$—$B_1/S_3$—$B_2/S_4$—$Li_2$ |
| (e) | coupling agent | polymodal tapered block copolymers with styrene terminal blocks | where S = styrene
B = butadiene
B/S = tapered block
Li = residue from a monoalkali metal initiator remaining on the end of the polymerization chain or reaction site prior to termination or coupling.
subscripts = designation of the numerical order in which that particular component was charged or formed.

The randomizer is usually added with the diluent initially charged to the reactor. Each of the charges which has two monomers may be either a mixture of the two monomers or simultaneous charging of two separate monomers.

As can be seen from the intermediate products listed in the charging sequence tables above, in two embodiments of the invention there are at least two distinct species of polymer chains before coupling. Thus, polymodal tapered block copolymers comprising relatively high and low molecular weight species can be produced.

Tapered blocks in each of the growing polymer chains are produced by simultaneously charging with at least two monomers as shown in the preceeding tables of the inventive charging sequences.

The randomizer regulates tapering or random polymerization of the monovinylaromatic monomer and the conjugated diene in a mixed monomer charge. Choice of randomizer can be used to manipulate the degree and direction of taper in blocks resulting from charges of mixtures of monomers. The taper can be either a graduation from conjugated diene rich chain to monovinylaromatic rich chain or a graduation from a monovinylaromatic rich chain to conjugated diene rich chain according to preference of the initiator-randomizer complex for one type monomer over the other. For example, when tetrahydrofuran is used as a randomizer, the diene enters into the chain faster than the monovinyl substituted aromatic; therefore, when both the monovinylaromatic monomer and the conjugated diene are present, the block tapers gradually from an essentially polybutadiene block to an essentially monovinyl substituted aromatic polymer block.

The weight ratio of monovinyl substituted aromatic monomer to conjugated diene monomer in each of the tapered blocks is from about 1:0.63 to about 1:2, preferably from about 1:0.67 to about 1:1.8, and more preferably from about 1:0.8 to about 1:1.5. The weight ratios of monovinyl substituted aromatic monomer to conjugated diene monomer in each of the tapered blocks in the same polymer chain do not have to be the same. See Example VII.

Generally each of the two tapered blocks made in steps (c) and (d) of the second embodiment of this invention can be of equal size; however, actual sizes of the two tapered blocks can vary within the same copolymer depending upon the amounts of monomers charged in each of the third and fourth monomer charges. See run 13 in Example VII.

Prior to coupling, all of the living polymer chains have monovinylaromatic terminal blocks on one end because of the initial monovinylaromatic charge (a) and charge (b) made with initiator; the living ends of the chains will have tapered blocks prior to coupling because of the charge containing both monovinylaromatic and conjugated diene monomers made next preceeding the coupling step.

In addition to the sequence of additions of the monomers and of the initiator, it is important to control the amount of each monomer and initiator addition at each stage or increment so that a suitable proportion of block sizes and proportion of polymodality is obtained.

Generally in a presently preferred first embodiment of this invention, if a polymer which is about 75 weight percent monovinylaromatic, based on total monomer weight, is used, from about 27 to about 80 weight percent of the total monovinylaromatic monomer is charged in step (a), from about 5 to about 21 weight percent of the total monovinylaromatic monomer is charged in step (b), and from about 7 to about 60 weight percent of the total monovinylaromatic monomer is charged in step (c). Generally more preferably, from about 40 to about 67 weight percent of the total monovinylaromatic monomer is charged in step (a), from about 8 to about 19 weight percent of the total monovinylaromatic monomer is charged in step (b), and from about 27 to about 40 weight percent of the total monovinylaromatic monomer is charged in step (c). Generally presently most preferably, from about 47 to about 60 weight percent of the total monovinylaromatic monomer is charged in step (a), from about 11 to about 16 weight percent of the total monovinylaromatic monomer is charged in step (b), and from about 29 to about 37 weight percent of the total monovinylaromatic monomer is charged in step (c).

Generally in a presently preferred second embodiment of this invention, if a polymer which is about 75 weight percent monovinylaromatic, based on total monomer weight, is used, from about 27 to about 80 weight percent of the total monovinylaromatic monomer is charged in step (a), from about 5 to about 21 weight percent of the total monovinylaromatic monomer is charged in step (b), from about 3 to about 19 weight percent of the total monovinylaromatic monomer is charged in step (c), and from about 13 to about 36 weight percent of the total monovinylaromatic monomer is charged in step (d). Generally more preferably, from about 40 to about 67 weight percent of the total monovinylaromatic monomer is charged in step (a), from about 8 to about 19 weight percent of the total monovinylaromatic monomer is charged in step (b), from about 5 to about 16 weight percent of the total monovinylaromatic monomer is charged in step (c), and from about 16 to about 32 weight percent of the total monovinylaromatic monomer is charged in step (d). Generally presently most preferably, from about 47 to about 60 weight percent of the total monovinylaromatic monomer is charged in step (a), from about 11 to about 16 weight percent of the total monovinylaromatic monomer is charged in step (b), from about 8 to about 13 weight percent of the total monovinylaromatic monomer is charged in step (c), and from about 20 to about 25 weight percent of the total monovinylaromatic monomer is charged in step (d).

In either of the two embodiments of this invention it is feasible to stretch out over an interval of time the addition of one or more of the increments of initiator, thus spreading (increasing) further the polymodality of the resulting product upon coupling.

The polymerization process is carried out in a hydrocarbon diluent at any suitable temperature in a range of about $-10°$ to about $150°$ C., preferably in the range of about $0°$ to about $110°$ C., at pressures sufficient to maintain the reaction mixture substantially in the liquid phase. Temperatures and pressures will peak during polymerization of each monomer charge and then decrease when essentially no free monomer is left to react. Appropriate hydrocarbon diluents include linear and cycloparaffins such as butane, pentane, hexane, octane, cyclohexane, cyclopentane and mixtures thereof. Presently preferred is cyclohexane. Generally the choice of hydrocarbon or hydrocarbon mixture and the temperature is such that the resulting polymer is in solution.

Small amounts of polar compounds are used to improve the effectiveness of alkylmonoalkali metal initiators such as n-butyllithium; dissociation of the alkylmonoalkali metal initiators affects the rate of initiation and polymerization. The polar compounds also effect partial randomization of the vinylarene/conjugated diene so as to increase the random portion of the tapered block. The polar compounds are generally used in admixture with the hydrocarbon diluent.

The amounts of polar compounds used as randomizers and promoters of effectiveness of initiators in this invention will vary according to the reactivity and effectiveness of the particular randomizer used. For example, 1,2-dimethoxyethane, tetramethylethylenediamine and 1,2-dimethoxybenzene are much more efficient randomizers than most of the others listed above when used with the particular initiators and monomers used in the invention runs described below. However, tetrahydrofuran is often used because the reaction will go nearer to completion in a shorter time after the initial reaction in the monomer rich environment. Also, there are dramatic variations in the amounts of each of these most efficient randomizers which will be needed. For example, for polymerizations such as those shown in the examples of invention runs in Example I of this application, much less tetrahydrofuran than 1,2-dimethoxyethane would be needed.

The amounts of polar compounds used as randomizers will also vary according to the desired molecular structure of the portions of tapered blocks which result from conjugated diene addition. For example, when using tetrahydrofuran, and it is desirable that the tapered blocks of the polymer have nearly equal amounts of 1,4 addition of butadiene and 1,2 addition of butadiene or only a little more 1,4 addition than 1,2 addition of butadiene, larger amounts of the tetrahydrofuran would be used than when more 1,4 addition is desired. When polymers with higher vinyl character resulting from 1,2 addition in excess of 1,4 addition are desired, then the useful amounts of tetrahydrofuran needed would be considerably larger. However, use of too much randomizer can result in excessive polymer-lithium termination during polymerization and/or poor stability of the polymer and/or undesired side reactions, depending upon choice of randomizer. Use of too little randomizer would result in inefficient initiator use, compositional variations and broader molecular weight distribution.

The initial monovinylaromatic charge is made with the randomizer present for the additional effect of causing the monovinylaromatic component resulting from each initiator charge to be of relatively narrow molecular weight distribution. In the two embodiments of this invention, by varying the amounts of initiator in each of the two charges having initiator, the differences in molecular weights of the monovinylaromatic components resulting from each of the two charges can be increased.

In each of the two embodiments of the invention, amounts of initiator employed are those which will produce resins with desirable melt flow which can be used in blends to make articles with a good balance of properties including minimal blueness, and good impact strength and/or ductility. Presently preferred when making invention polymers to be used in blends are amounts of initiator in each of the two initiator charges sufficient to obtain a block copolymer having a melt flow in the range from about 2 to about 50 g/10 minutes, more preferably from about 4 to about 30 g/10 minutes, and most preferably from about 7 to about 20 g/10 minutes, as determined by ASTM D1238-73, condition 200° C./5.0 kg. The amounts of initiator contemplated as useful in each of the two charges having initiator are shown in Tables 3 and 4.

Use of too small an amount of initiator would result in high molecular weight polymers. Conversely, use of too large an amount of initiator would result in polymers having short chain polymeric species and low molecular weight.

The weight ratio of the amounts of initiator in each of the charges having initiator can be represented as 1:0.25–300.

$$Li_1 :: Li_2 :: 1 : 0.25 - 300$$

wherein $Li_1$ = initiator in the first charge $Li_2$ = initiator in the second charge More preferably for most applications, the amount of initiator in the second charge of initiator is from about 0.3 to about 10 times, based on weight, as much as the amount of initiator in the first initiator charge. Generally, presently most preferably, the amounts of initiators are selected such that the amount in the second charge is only slightly smaller, equal to, or larger than that employed in the first charge.

Varying the weight ratios of amounts of the initiator charges will result in variations of the proportionate amounts of species present in the copolymer. Other factors affecting the proportionate amounts of species present in the copolymer include presence of impurities and/or scavengers in the reactor, effectiveness of the polar randomizer as a promoter and choice of coupling agent(s).

The polymerization is carried out in a substantial absence of oxygen and water, preferably under an inert gas atmosphere. Prior to the coupling step, the reaction mass contains a very high percentage of molecules (polymer chains) in which an alkali metal cation is positioned at one end of each polymer chain. Impurities in the feed such as water or alcohol reduce the amounts of monoalkali metal polymer in the reaction mass.

After essentially complete polymerization of the final charge added to the polymer, one or more suitable difunctional or polyfunctional coupling agents is added. As used here, the term "coupling" means the bringing together and joining, by means of one or more central coupling atoms or coupling moieties, two or more of the living monoalkali metal-terminated polymer chains. A wide variety of compounds for such purposes can be employed.

Any effective amount of the coupling agent can be employed. While the amount is not believed to be particularly critical, a stoichiometric amount relative to the active polymer-alkali metal tends to promote maximum coupling as a generality. Presently preferred is an amount of coupling agent slightly greater than stoichiometric relative to the active polymer-alkali metal. However, less than stoichiometric amounts can be used for higher degrees of coupling where desired for particular products of broadened molecular weight distribution.

Typically, in each of the embodiments of this invention, the total amount of coupling agent is in the range of about 0.005 to 10 phm (parts per 100 parts of total monomers employed in the polymerization). Preferred when most combinations of monomers and coupling agents are used to practice this invention is about 0.2 to about 0.6 phm of coupling agent, depending on amounts of initiator used. Presently most preferred is about 0.3 to about 0.5 phm, depending upon amounts of initiator used. Use of an amount of a reasonably highly efficient coupling agent within these ranges provides polymers with a moderately broad molecular weight distribution that has proven useful to custom molders. Use of an insufficient amount of coupling agent will result in less complete coupling of the living polymer chains or, depending upon choice of coupling agent, more branching; use of an excessive amount of coupling agent will also result in more uncoupled chains.

At the conclusion of the coupling process, the coupled polymer may still contain bound polymeric alkali metal alkoxides depending on the type of coupling agent employed. The system is treated with an active compound such as water, alcohol, phenols, carbon dioxide or linear saturated aliphatic mono- and dicarboxylic acids to remove any remaining alkali metal from the copolymer chain.

While the polymer product is still in solution, stabilization agents can be added. Additional stabilizers could be added during finishing before pelletizing. This treatment will provide oxidative stability for the polymer during processing and handling and subsequent long term use by the customer.

Commonly used stabilization processes can use a combination of compounds which include, but are not limited to, a hindered phenol and an organophosphite, particular examples of which are octadecyl 3-(3', 5'-di-t-butyl-4'-hydroxyphenyl) propionate and tris-nonylphenylphosphite.

After stabilization, the hydrocarbon diluent is then flashed from the polymer solution to increase the solids content. The polymer cement, i.e., the polymer in the polymerization solvent, usually contains about 10 to 40, more usually 20 to 35, weight percent solids, the balance solvent. Preferably, but not necessarily, the polymer cement is flashed to remove by evaporation a portion of the solvent so as to reduce the solvent content to a concentration of about 0 to 50, more usually about 0 to 10, weight percent (corresponding to a solids content of about 100 to 50, more usually about 100 to 90, weight percent).

Flashing of the polymer cement may be followed by desolventizing extrusion with vacuum in commercial production or by other vacuuming processes to achieve consistent solvent content of less than 0.3 weight percent.

The resinous copolymeric products can be, and normally are, compounded with anti-oxidants, anti-blocking agents, release agents and other additives, as known in the compounding arts.

Typical charging sequences and useful ranges of amounts of the charges for each of the two embodiments of this invention are given in Tables 3 and 4.

TABLE 3

Ranges of Amounts of Components in a Typical Invention Charging Sequence[a]
(First Embodiment)

| Step | Component[b] | Broad Range[c] | Preferred Range[c] | More Preferred Range[c] |
|------|--------------|----------------|--------------------|--------------------------|
| (a)  | randomizer[d] | 0.001–3.0 | 0.005–1.5 | 0.015–0.3 |
|      | initiator | 0.005–1.5 | 0.01–0.1 | 0.01–0.05 |
|      | and monovinylarene monomer | 20–60 | 30–50 | 35–45 |
| (b)  | initiator | 0.005–1.5 | 0.01–1.0 | 0.02–0.1 |
|      | and monovinylarene monomer | 4–16 | 6–14 | 8–12 |
| (c)  | monovinylarene monomer | 5–45 | 20–30 | 22–28 |
|      | and conjugated diene monomer | 5–45 | 20–30 | 22–28 |
| (d)  | coupling agent | 0.005–10 | 0.2–0.6 | 0.3–0.5 |

[a]Charges of monomer and initiator are made in the presence of an amount of diluent or solvent sufficient to prevent excessive heat of reaction.
[b]Monomers within each charge having more than one monomer can be added simultaneously or as a mixture, slowly or quickly. Randomizer in charge (a) may be already present in the diluent or added as a separate charge.
[c]Ranges of amounts are given in parts by weight per 100 parts by weight of total monomers (phm).
[d]To achieve high vinyl content, up to 3 phm randomizer may be used.

TABLE 4

Ranges of Amounts of Components in a Typical Invention Charging Sequence[a]
(Second Embodiment)

| Step | Component[b] | Broad Range[c] | Preferred Range[c] | More Preferred Range[c] |
|------|--------------|----------------|--------------------|--------------------------|
| (a)  | randomizer[d] | 0.001–3 | 0.005–1.85 | 0.015–0.3 |
|      | initiator and | 0.005–1.50 | 0.01–0.1 | 0.04–0.08 |
|      | monovinylarene monomer | 20–60 | 30–50 | 35–45 |
| (b)  | initiator and | 0.005–1.5 | 0.01–1.0 | .03–.07 |
|      | monovinylarene monomer | 4–16 | 6–14 | 8–12 |
| (c)  | monovinylarene monomer and | 2–14 | 4–12 | 6–10 |
|      | conjugated diene monomer | 2–13 | 3–11 | 5–9 |
| (d)  | monovinylarene monomer and | 10–27 | 12–24 | 15–19 |
|      | conjugated diene monomer | 8–28 | 13–23 | 16–20 |
| (e)  | coupling agent | 0.005–10 | 0.2–0.6 | 0.3–0.5 |

[a]Charges of monomer and initiator are made in the presence of an amount of diluent or solvent sufficient to prevent excessive heat of reaction.
[b]Monomers within each charge having more than one monomer can be added simultaneously or as a mixture, slowly or quickly. Randomizer in charge (a) may be already present in the diluent or added as a separate charge.
[c]Ranges of amounts are given in parts by weight per 100 parts by weight of total monomers (phm).
[d]To achieve high vinyl content, up to 3 phm randomizer may be used.

After coupling at least the coupled and uncoupled polymeric species shown in Tables 5 and 6 are present in the polymodal polymers of the first and second embodiments, respectively, of this invention.

TABLE 5

Polymeric Species Included in First Embodiment $S_1$—$S_2$—$B_1/S_3$-x-$S_3/B_1$—$S_2$—$S_1$ $S_1$—$S_2$—$B_1/S_3$-x-$S_3/B_1$—$S_2$ $S_2$—$B_1/S_3$-x-$S_3/B_1$—$S_2$ TABLE 5-continued Polymeric Species Included in First Embodiment $S_2$—$B_1/S_3$ $S_1$—$S_2$—$B_1/S_3$ S = monovinylaromatic block
B = conjugated diene block
B/S = tapered block
x = coupling moiety or coupling site
subscripts = indications of the charges which were the source of the polymer blocks.

TABLE 6

Polymeric Species Included in Second Embodiment $S_1-S_2-B_1/S_3-B_2/S_4\text{-x-}S_4/B_2-S_3/B_1-S_2-S_1$
$S_1-S_2-B_1/S_3-B_2/S_4\text{-x-}S_4/B_2-S_3/B_1-S_2$
$S_2-B_1/S_3-B_2/S_4\text{-x-}S_4/B_2-S_3/B_1-S_2$
$S_2-B_1/S_3-B_2/S_4$
$S_1-S_2-B_1/S_3-B_2/S_4$ S = monovinylaromatic block
B = conjugated diene block
B/S = tapered block
x = coupling moiety or coupling site
subscripts = indications of the charges which were the source of the polymer blocks.

In each of the embodiments depending upon choice and amount of coupling agent or agents and whether coupling agents are charged as a mixture or incrementally, there can be present other polymeric species with varying degrees of branching.

Blends

The resinous polymodal copolymer products of this invention can be blended with other polymers such as acrylonitrile-butadiene-styrene copolymers (ABS), styrene-acrylonitrile copolymers (SAN), and other styrene copolymers. When less transparency is desired or transparency is not necessary, the invention copolymers can be blended with polyolefins and/or olefin copolymers.

Blends of the invention polymers with polymers of styrene are particularly useful applications for the improved tapered block copolymers of this invention. Articles made from these blends have surprisingly low blueness and advantageous impact strength and/or ductility. For example, articles made from styrene homopolymer and either of the two embodiments of this invention typically have Hunter negative b blueness values of less than 20, most often less than 18. Thus, less of the invention copolymer is needed to achieve high impact strength, while retaining reasonably low blueness, in articles made from blends with styrene homopolymers than would be needed of other comparative polymodal monovinylaromatic-conjugated diene block copolymers.

The presently preferred polymers of styrene employed in the blends of this invention are usually (a) homopolymers of styrene; or (b) copolymers of styrene as a major component with a minor amount of any other copolymerizable monovinyl aromatic compound other than styrene, such as alpha-methylstyrene, vinyltoluene or para-tertiary-butyl styrene. A minor amount of other monomers such as methyl acrylate, methyl methacrylate, acrylonitrile and the like can be copolymerized with the styrene.

The invention copolymers can be blended with styrene resins made in bulk polymerization. These resins are commonly prepared by heating styrene and any comonomer at temperatures in the range of 100° to 200° C. with application of pressure, if necessary, to combine the monomers. The polymerization can also be carried out at lower temperatures by the addition of free-radical generating peroxidic catalysts such as benzoyl peroxide, acetyl peroxide, di-t-butyl peroxide and the like. Alternatively, the polymerization can be carried out in suspension to yield a dry powder or in emulsion, usually resulting in a latex of polystyrene which can be coagulated to yield the solid powdery polystyrene. The polymerization can also be carried out in solution with precipitation of the product, if desired. Solvent can be removed by standard techniques such as steamstripping or solvent evaporation.

High impact polystryene (HIPS) also can be successfully employed in blends with the invention copolymers. Suitable high impact polystyrenes can be prepared by polymerizing styrene in the presence of an elastomer, typically polybutadiene rubber. In these resins the polystyrene forms the bulk of the resin throughout which the grafted rubber polystyrene particles are dispersed.

The blends of this invention can be prepared by any suitable means including blending, tumbling and extrusion. Examples of these methods include, but are not limited to, dry mixing in the form of a powder or pellets, wet mixing in the form of a solution or slurry, and melt extrusion compounding.

The polymers and any other ingredients or additives may be mechanically blended together in the desired proportions with the aid of any suitable mixing device conveniently used for mixing rubbers or plastics, such as, for example, a differential roll mill, a Banbury mixer, or an extruder.

In these types of blending methods the polymers and any other components and additives used can be in any form, such as, for example, fluff, powder, granulate, pellet, solution, slurry, and/or emulsion. Any additive can be combined with the polymers according to any method known in the art. Examples of incorporation methods include, but are not limited to, dry mixing in the form of a powder and wet mixing in the form of a solution or slurry.

Melt extrusion compounding can be carried out using any suitable method such as in single screw or twin screw extruders or other melt extruders at temperatures above the melting point or glass transition temperature of the polymers.

The presently preferred method comprises blending the polymers in powder or granulate form and extruding the blend in sheet form to feed a thermoformer or direct feed to an injection or blow molder.

In order to facilitate thorough mixing of the polymers and to develop the desired combination of physical properties, pellets are generally metered by loss-in-weight feeders or by screw feeders at a temperature low enough to avoid softening the pellets. The metered pellets are dropped into an extruder which melts and blends the components to provide a homogenous melt.

Alternatively, solution blending methods known in the art may be used.

The ranges of amounts of polymers useful in blends varies according to the properties and economics required. For example, when an invention copolymer is blended with a polymer of styrene, practical ranges include using amounts such as from about 10 to about 70 weight percent polymer of styrene, more usually from about 20 to about 65 weight percent polymer of styrene, and most preferably from about 30 to about 60 weight percent polymer of styrene with the balance being one or more of the polymodal resinous copolymer products of this invention. For a more particular example, when the invention copolymers are blended with general purpose polystyrene, broad ranges include using amounts such as from about 10 to about 70 weight percent polystyrene, more usually from about 20 to about 65 weight percent polystyrene, and most preferably from about 30 to about 60 weight percent polystyrene with the balance being one or more of the polymodal resinous copolymer products of this invention. Generally, use of too much of the invention copolymers in a blend would result in good properties but loss of economic advantage. Use of too little of the invention copolymers in a blend would result in loss of impact resistance. These blends can be economical ways of gaining the desirable attributes of both polystyrene and the invention polymers while maintaining low blueness in articles made from the blends.

The compositions of this invention or blends thereof can be extruded, thermoformed, injection molded, blow molded, or made into films or sheets. Articles made from the compositions of this invention are transparent with low blueness, have good impact strength and have other physical properties within acceptable ranges for such applications as drinking cups, lids, bottles, other food containers, medical drainage units, shrink wrap and over-wrap. Articles made from blends of the copolymers of this invention can economically provide advantageous properties for similar applications.

Test Procedures

The blend blueness values were determined on a Hunter Lab colormeter Model D 25 using the Hunter Lab procedure. Blueness values are expressed as −b, where larger absolute numbers indicate more blueness.

Other properties were tested using ASTM procedures as shown in Table 7.

TABLE 7

Test Procedures Used

| Property | ASTM Method |
| --- | --- |
| Flow rate, g/10 min Condition 200° C./5.0 kg | D 1238-88 |
| Haze, % | D 1003-61 (1990) |
| Transmittance, % | D 1003-61 (1990) |
| Shore D hardness | D 2240-91 |
| Tensile strength at yield and break, MPa | D 638-91 at 50 mm/min Type I test specimens |
| Elongation at yield and break, % | D 638-91 at 50 mm/min |
| Flexural modulus, MPa | D 790-86 |
| Izod impact strength, notched, J/m | D 256-88 |
| Vicat softening point, ° C. | D 1525-91 |
| Total energy dart drop, J | D 4272-85 |

EXAMPLES

The following examples will describe in more detail the experimental process used and the polymodal tapered block copolymers with vinylarene terminal blocks obtained as a result of the process and blends made with the invention copolymers. These examples should be taken as illustrative and not restrictive.

Styrene and butadiene were chosen as monomers to exemplify the invention, and randomizer, initiator, coupling agent and diluent appropriate for these monomers were used. Quantities of reagents are usually expressed in parts per hundred monomer (phm) based on the total weight of monovinylarene and conjugated diene employed.

Example I

This example describes four invention polymerization runs (1, 2, 3, 4) that were carried out to produce resinous polymodal, coupled, tapered block styrene-butadiene copolymers with resinous terminal blocks. These runs exemplify the first embodiment of the invention. Styrene (from Stirling Chemical) and 1,3-butadiene (from El Paso Tex.) were dried by passage over activated alumina (Kaiser A-201), and then copolymerized and coupled in a 4-stage process using n-butyllithium initiator (from Lithium Corporation of America).

Polymerization runs were carried out under nitrogen in a stirred, jacketed, stainless steel 7.6-liter reactor employing essentially anhydrous reactants and conditions. The anhydrous mixtures were stirred continuously during the polymerization process. The cyclohexane diluent, which contained 0.04 phm tetrahydrofuran (THF) in each polymerization in this example, was preheated to about 50° C. before monomers were charged to the reactor. The n-butyllithium was charged as a 2 weight percent solution in cyclohexane. In the polymerization step in which both butadiene and styrene were charged, they were charged simultaneously as a mixture.

In the coupling step, the Vikoflex® 7170 coupling agent used was an epoxidized vegetable oil commercially available from Viking Chemical Company. In the terminating step, carbon dioxide from a pressurized container was admitted to provide about 0.4 phm carbon dioxide to the reactor. Water was also added in an amount slightly in stoichiometric excess of the initiator to separate the lithium residues from the polymer chains.

The antioxidant mixture added in the stabilizing step contained a hindered phenol [octadecyl 3-(3', 5'-di-t-butyl-4'-hydroxyphenyl) propionate, commercially available as Irganox® 1076 from Ciba-Geigy] and an organic phosphite (trisnonylphenyl phosphite, available as TNPP from GE Specialty Chemicals). Each stabilizer was dissolved separately in cyclohexane and mixed together. Enough of the mixture was added to the reactor to provide 0.25 phm hindered phenol and 1 phm organic phosphite. In Runs 1 and 2 a microcrystalline wax (BE Square® 195) was also added as an antiblocking agent.

After each addition of monomer, initiator or additive, the feed lines were rinsed with approximately 10–20 phm cyclohexane solvent and cleared with a nitrogen sparge.

Following the stabilization step, each copolymer solution was flashed at 178–180° C. to remove a portion of the diluent. Substantially all of the remaining diluent was removed in a vacuum oven by drying at 90° C. for one hour. The resulting polymer was chopped in a granulator into crumb size and then dried for an additional hour in a vacuum oven.

In each of the four runs (1, 2, 3, and 4), 1500 g total monomers (butadiene and styrene) were used. About 76 weight percent of the total amount of cyclohexane diluent (3130 g) was charged initially. The remaining cyclohexane diluent was added during the run as a diluent or flush for the various reactants added in subsequent steps. In these four polymerizations, the weight ratio of total monomers charged was 75/25 styrene/butadiene.

The charges and the results of the runs are summarized in Table 8. Tapered butadiene/styrene blocks were formed in step 3 by charging both butadiene and styrene monomers. The charging sequence used was i, $S_1$, i, $S_2$, $B_1/S_3$, coupling agent. The monomer ratios corresponding to the $S_1$, $S_2$, $B_1/S_3$ sequence were 40, 10, 25/25. Weight ratios of amounts of initiator used in the first two steps of each of the four runs was kept constant at 1:1, but the amounts were decreased from 0.08 phm in run 1 to 0.055 phm in run 4 to provide a series of decreasing melt flow resins.

The devolatilized copolymers from runs 1, 2, 3, and 4 were designated invention copolymers 1, 2, 3 and 4, and had melt flows of 39.1 g/10 min, 19.0 g/10 min, 9.0 g/10 min and 4.8 g/10 min, respectively. The differences in melt flows were attributable to differences in amounts of initiator used in each of the four runs.

TABLE 8

Invention Runs - First Embodiment

| Components[a] | Run 1 | Run 2 | Run 3 | Run 4 |
|---|---|---|---|---|
| Step 1 | | | | |
| Cyclohexane, phm | 145 | 145 | 145 | 145 |
| Tetrahydrofuran, phm | 0.04 | 0.04 | 0.04 | 0.04 |
| n-Butyllithium initiator, phm | 0.08 | 0.07 | 0.06 | 0.055 |
| Styrene, phm | 40 | 40 | 40 | 40 |
| Polymerization Time, min | 12 | 12 | 12 | 12 |
| Peak Polymerization Temperature, °C. | 82 | 81 | 85 | 85 |
| Step 2 | | | | |
| n-Butyllithium initiator, phm | 0.08 | 0.07 | 0.06 | 0.055 |
| Styrene, phm | 10 | 10 | 10 | 10 |
| Polymerization Time, min | 12 | 12 | 12 | 12 |
| Peak Polymerization Temperature, °C. | 67 | 70 | 71 | 70 |
| Step 3 | | | | |
| Butadiene, phm | 25 | 25 | 25 | 25 |
| Styrene, phm | 25 | 25 | 25 | 25 |
| Polymerization Time, min | 16 | 16 | 16 | 16 |
| Peak Polymerization Temperature, °C. | 122 | 122 | 122 | 116 |
| Step 4 (Coupling) | | | | |
| Vikoflex 7170, phm | 0.4 | 0.4 | 0.4 | 0.4 |
| Time, min | 16 | 16 | 16 | 16 |
| Temperature, °C. | 94 | 93 | 90 | 93 |
| Step 5 (Terminating) | | | | |
| Water, phm | 0.2 | 0.2 | 0.2 | 0.2 |
| Carbon Dioxide, phm | 0.4 | 0.4 | 0.4 | 0.4 |
| Time, min | 25 | 25 | 25 | 25 |
| Temperature, °C. | 80 | 93 | 87 | 81 |
| Step 6 (Stabilizing) | | | | |
| Stabilizer Mixture, phm | 1.25 | 1.25 | 1.25 | 1.25 |
| BE Square wax | 0.15 | 0.15 | 0.15 | 0.15 |
| Time, min | 5 | 5 | 5 | 5 |
| Temperature, °C. | n.a. | n.a. | 84 | n.a. |
| Recovered Resin | | | | |
| Melt Flow, g/10 min | 39.1 | 19.0 | 9.0 | 4.8 |
| Mw/Mn, thousands | 105/63 | 108/53 | 128/65 | 143/91 |
| Heterogeneity Index | 1.67 | 2.05 | 1.97 | 1.57 |

[a]After each addition of monomer, initiator or additive, the feed lines were rinsed with approximately 5–20 phm cyclohexane diluent and cleared with nitrogen.

Example II

Three more polymerization runs were carried out according to the first embodiment of the present invention to demonstrate the effects of varying the weight ratio of amounts of initiator in each of the two initiator charges. The charges and results of the runs are shown in Table 9. Again, the weight ratio of styrene to butadiene charged was 75 to 25. Samples were made with i, $S_1$, i, $S_2$, $B_1/S_3$ addition sequence followed by coupling; monomer ratios of 40, 10, 25/25 were used.

In each of the three runs of this example, 0.03 phm initiator was charged in the first step. The amount of initiator charged in the second step was varied from 0.08 phm (run 5) to 0.095 phm (run 7) for a range of ratios of amount of initiator in first step to amount in second step from 1:2.7 (run 5) to 1:3.2 (run 7).

Copolymers from runs 5, 6 and 7 were devolatilized to form invention copolymers 5, 6 and 7, which had melt flows of 5.0 g/10 min, 5.4 g/10 min, and 7.1 g/10 min, respectively.

TABLE 9

Invention Runs - First Embodiment

| Components[a] | Run 5 | Run 6 | Run 7 |
|---|---|---|---|
| Step 1 | | | |
| Cyclohexane, phm | 145 | 145 | 145 |
| Tetrahydrofuran | 0.04 | 0.04 | 0.04 |
| n-Butyllithium initiator, phm | 0.03 | 0.03 | 0.03 |
| Styrene, phm | 40 | 40 | 40 |
| Polymerization Time, min | 12 | 12 | 12 |
| Peak Polymerization Temperature, °C. | 77 | 79 | 76 |
| Peak Polymerization Pressure, psi | | | |
| Step 2 | | | |
| n-Butyllithium initiator, phm | 0.08 | 0.085 | 0.095 |
| Styrene, phm | 10 | 10 | 10 |
| Polymerization Time, min | 12 | 12 | 12 |
| Peak Polymerization Temperature, °C. | 64 | 71 | 65 |
| Step 3 | | | |
| Butadiene, phm | 25 | 25 | 25 |
| Styrene, phm | 25 | 25 | 25 |
| Polymerization Time, min | 16 | 16 | 16 |
| Peak Polymerization Temperature, °C. | 117 | 121 | 111 |
| Step 4 (Coupling) | | | |
| Vikoflex 7170, phm | 0.4 | 0.4 | 0.4 |
| Time, min | 16 | 16 | 16 |
| Temperature, °C. | 88 | 87 | 89 |
| Step 5 (Terminating) | | | |
| Water, phm | 0.2 | 0.2 | 0.2 |
| Carbon Dioxide, phm | 0.4 | 0.4 | 0.4 |
| Time, min | 25 | 25 | 25 |
| Temperature, °C. | 82 | 82 | 84 |
| Step 6 (Stabilizing) | | | |
| Stabilizer Mixture, phm | 1.25 | 1.25 | 1.25 |
| BE Square wax | 0.15 | 0.15 | 0.15 |
| Time, min | 5 | 5 | 5 |
| Recovered Resin | | | |
| Melt Flow, g/10 min | 5.0 | 5.4 | 7.1 |
| Mw/Mn, thousands | 181/414 | 177/111 | 138/93 |
| Heterogeneity Index | 1.6 | 1.6 | 1.69 |

[a]After each addition of monomer, initiator or additive, the feed lines were rinsed with approximately 5–20 phm cyclohexane diluent and cleared with nitrogen.

Example III

To demonstrate the second embodiment of this invention, three more polymerization runs were carried out according to the procedures described in Example I, with the exception that the sequences and amounts of charges were as shown in Table 10. Tapered butadiene/styrene blocks were formed in the third and fourth steps by charging a mixture of butadiene and styrene monomers. The monomer addition sequence was i, $S_1$, i, $S_2$, $B_1/S_3$, $B_2/S_4$ followed by coupling; the monomer weight ratios were 40, 10, 12.5/12.5, 12.5/12.5, respectively. The polymers were 75 percent styrene and 25 percent butadiene.

In each of the three runs of this example the weight ratio of amount of initiator in the first step to the amount in the second step was kept constant at 1:1 with the absolute amount varied from 0.05 phm (run 9) to 0.06 phm (run 8).

The copolymers produced in the three runs were designated invention copolymers 8, 9, and 10, and had melt flows of 14.3, 6.40 and 10.8 respectively. It is believed that lower melt flows are attributable to lower amounts of initiator. The polymerizations of invention runs 8, 9 and 10 are shown in Table 10.

TABLE 10

Invention Runs - Second Embodiment

| Components[a] | Run 8 | Run 9 | Run 10 |
|---|---|---|---|
| Step 1 | | | |
| Cyclohexane, phm | 145 | 145 | 145 |
| Tetrahydrofuran, phm | 0.04 | 0.04 | 0.04 |
| n-Butyllithium initiator, phm | 0.06 | 0.05 | 0.055 |
| Styrene, phm | 40 | 40 | 40 |
| Polymerization Time, min | 12 | 12 | 12 |
| Peak Polymerization Temperature, °C. | 85 | 82 | 84 |
| Step 2 | | | |
| n-Butyllithium initiator, phm | 0.06 | 0.05 | 0.055 |
| Styrene, phm | 10 | 10 | 10 |
| Polymerization Time, min | 12 | 12 | 12 |
| Peak Polymerization Temperature, °C. | 69 | 69 | 70 |
| Step 3 | | | |
| Butadiene, phm | 12.5 | 12.5 | 12.5 |
| Styrene, phm | 12.5 | 12.5 | 12.5 |
| Polymerization Time, min | 16 | 16 | 16 |
| Peak Polymerization Temperature, °C. | 84 | 83 | 84 |
| Step 4 | | | |
| Butadiene, phm | 12.5 | 12.5 | 12.5 |
| Styrene, phm | 12.5 | 12.5 | 12.5 |
| Polymerization Time, min | 16 | 16 | 16 |
| Peak Polymerization Temperature, °C. | 96 | 102 | 102 |
| Step 5 (Coupling) | | | |
| Vikoflex 7170, phm | 0.4 | 0.4 | 0.4 |
| Time, min | 16 | 16 | 16 |
| Temperature, °C. | 82 | 89 | 89 |
| Step 6 (Terminating) | | | |
| Water, phm | 0.2 | 0.2 | 0.2 |
| Carbon Dioxide, phm | 0.4 | 0.4 | 0.4 |
| Time, min | 25 | 25 | 25 |
| Temperature, °C. | 80 | 82 | 82 |
| Step 7 (Stabilizing) | | | |
| Stabilizer Mixture, phm | 1.25 | 1.25 | 1.25 |
| Antiblocking agent, phm | 0.15 | 0.15 | 0.15 |
| Time, min | 5 | 5 | 5 |
| Temperature, °C. | 80 | n.a. | 81 |
| Recovered Resin | | | |
| Melt Flow, g/10 min | 14.3 | 6.4 | 10.8 |
| Mw/Mn, thousands | 154/104 | 173/115 | 147/91 |
| Heterogeneity Index | 1.48 | 1.50 | 1.62 |

[a]After each addition of monomer, initiator or additive, the feed lines were rinsed with approximately 5–20 phm cyclohexane diluent and cleared with nitrogen.

Example IV

Two comparative polymers were used for comparisons of physical properties of blends made with polystyrene. Comparative polymer 11 was a resinous styrene-butadiene copolymer with a melt flow of 8.4 g/10 min. Polymer 11 was polymodal from multiple initiator and monomer charges (S, i, i, S, B, i, S, B) and coupled with an epoxidized vegetable oil coupling agent. Polymer 11 contained nominally 75 wt % styrene and 25 wt % butadiene with no styrene/butadiene tapered blocks. Polymer 11 forms 50:50 by weight blends with polystyrene that have high blueness and modest physical properties.

Comparative polymer 12 was a styrene-butadiene copolymer with no tapered block segments. Polymer 12 contained nominally 75 wt % styrene and 25 wt % butadiene and had a melt flow of 8.8 g/10 min. It had a polymodal molecular weight from multiple initiator and monomer charges (S, i, i, S, B) and was coupled with an epoxidized vegetable oil coupling agent. Polymer 12 formed 50:50 blends by weight with polystyrene that have low blueness and modest impact properties.

Example V

A series of blends of the invention polymers from Examples I and II was prepared with Novacor® 555 general purpose polystyrene to demonstrate the properties of blends of copolymers containing a single tapered block (invention embodiment 1). Polymer 5 was not included in the blend series since it had a melt flow essentially the same as that of polymer 4. Polymers 11 and 12 were also blended with polystyrene for comparison.

The blends were 50:50 by weight and were prepared by solution blending in cyclohexane in a reactor at 100° C. with stirring for one hour. Each solution was flashed to remove the solvent and the polymer was dried, chopped in a granulator, and dried again. The dry polymer was processed on a roll mill and chopped again before injection molding on an Arburg model 90 injection molder with zones 1, 2, 3, and nozzle at 210° C., 210° C., 220° C., and 210° C., respectively, to make specimens to test for properties.

For convenient reference, blends are designated as blends with the corresponding polymer number and a prime. For example, a blend prepared from polymer 1 and polystyrene is blend 1' and a blend prepared from polymer 2 and polystyrene is designated blend 2'.

The blend test results are shown in Table 11. Test specimens made from the first four blends had less blueness than test specimens made from the comparative polymers. Specimens made from blends 6' and 7' had essentially the same blueness as specimens made from blend 12'.

Test specimens made from blends 1', 2', 3', 4', and 6' had Izod impact values higher than those made from comparative blends 11' and 12'. Test specimens made from blend 7' had a lower Izod impact value than those made from the other blends. It is possible that the high level of initiator in step two of the polymerization of polymer 7 and the resulting higher melt flow of the final resin prevented improvement in the Izod impact value of Arburg test specimens made from blends polymer 7.

Test specimens made from blends 1', 2', and 3' had higher haze values and specimens made from blends 1' and 2' had higher melt flows than those made from the other blends.

TABLE 11

Physical Properties of Test Specimens Made from Polymer Blends with Polystyrene[a]

| Property | Invention Blend 1' | Invention Blend 2' | Invention Blend 3' | Invention Blend 4' | Invention Blend 6' | Invention Blend 7' | Comparative Blend 11' | Comparative Blend 12' |
|---|---|---|---|---|---|---|---|---|
| Styrene-butadiene copolymer | 1 | 2 | 3 | 4 | 6 | 7 | 11 | 12 |
| Blend melt flow, g/10 min | 35.5 | 30.2 | 19.0 | 11.5 | 10.7 | 12.8 | 16.8 | 17.5 |
| Haze, % | 12.3 | 8.1 | 7.1 | 5.3 | 3.4 | 4.2 | 4.3 | 2.7 |
| Hunter blueness, b | −15.5 | −16.2 | −15.7 | −16.3 | −16.9 | −17.1 | −20.3 | −16.8 |
| Shore D Hardness | 76 | 77 | 78 | 77 | 77 | 77 | 77 | 79 |
| Notched Izod impact, J/m | 14.5 | 14.6 | 18.1 | 20.3 | 17.1 | 12.3 | 12.4 | 13.9 |
| Vicat, °83.4 | 83.4 | 82.9 | 86.8 | 89.8 | 92.1 | 92.0 | 85.3 | 89.3 |
| Tensile strength | | | | | | | | |
| yield, MPa | 39.4 | 40.2 | 40.4 | 43.7 | 44.5 | 42.5 | 37.8 | 42.6 |
| break, MPa | 24.8 | 27.5 | 29.8 | 33.6 | 33.7 | 21.4 | 28.0 | 33.4 |
| Elongation | | | | | | | | |
| yield, % | 5.2 | 5.3 | 5.3 | 6.6 | 6.2 | 6.2 | 4.8 | 4.8 |
| break, % | 17.7 | 18.2 | 24.9 | 15.0 | 14.7 | 13.7 | 32.0 | 15.77 |
| Flexural modulus, MPa | 1754 | 1836 | 1862 | 2107 | 2091 | 2016 | 1979 | 2124 |

[a]50:50 Styrene-butadiene copolymer:polystyrene

Example VI

A series of blends of double tapered block invention polymers (second invention embodiment) with polystyrene was prepared to demonstrate the properties of articles made from the blends. Copolymers 8, 9, and 10 from Example III were blended as described in Example V in 50:50 by weight mixtures with general purpose polystyrene to form blends 8', 9', and 10'. Test specimens were injection molded from the blends as described in Example V.

The results (Table 12) show that articles made from blends of invention polymers 8, 9, and 10 had better Izod impact values than those made from comparative blends 11' and 12' (shown in Table 11). Articles made from blends of the invention polymers also have less blueness than those made from comparative blend 11'.

TABLE 12

Physical Properties of Polymer Blends With Polystyrene[a]

| Property | Invention Blend 8' | Invention Blend 9' | Invention Blend 10' | Comparative Blend 11' |
|---|---|---|---|---|
| Styrene-butadiene copolymer | 8 | 9 | 10 | 11 |
| Blend melt flow, g/10 min | 14.8 | 12.0 | 14.8 | 16.8 |
| Haze, % | 4.1 | 4.0 | 5.1 | 4.3 |
| Hunter blueness, b | −17.9 | −18.5 | −17.9 | −20.3 |
| Shore D hardness | 76 | 77 | 76 | 77 |
| Notched Izod impact, J/m | 14.9 | 17.1 | 19.2 | 12.3 |
| Vicat softening, ° C. | 89.3 | 90.5 | 90.5 | 85.3 |
| Tensile Strength | | | | |
| yield MPa | 43.2 | 43.9 | 42.5 | 37.8 |
| break MPa | 28.6 | 28.7 | 28.7 | 28.0 |
| Elongation | | | | |
| yield, % | 6.4 | 6.5 | 6.5 | 4.8 |
| break, % | 17.9 | 16.7 | 13.6 | 32.0 |
| Flexural modulus, MPa | 1988 | 1949 | 1986 | 1979 |

[a]50:50 Styrene-butadiene copolymer:polystyrene

Example VII

Three more invention copolymers were prepared on a larger scale to demonstrate further the effect of two butadiene/styrene tapered blocks in improving impact properties of articles made from blends of the invention copolymers with polystyrene. These polymerizations varied the size of the two tapered blocks and the weight ratios of initiator charges. The polymerizations were carried out in a 380 L reactor.

The polymer polymerization recipes are shown in Table 13. Each polymer was prepared with the sequence i,S,i,S, B/S,B/S. Polymer 13 monomer charge weight ratios of 40, 10, 6.9/7.8, 18.1/17.2. Polymer 14 had monomer charge weight ratios of 40, 10, 5.9/10, 19.1/14.4. Polymer 15 had monomer charge ratios of 40, 10, 5.9/10, 19.1/14.4. Monomer charge ratios for polymers 14 and 15 do not add up to 100 phm use of charge irregularities; phm indicated above was that actually charged. The initiator weight ratios for steps 1:2 in polymerizations 13, 14, and 15 were 1:0.79, 1:0.92, and 1:0.89, respectively.

Flow rates for the three polymers were 7.0, 11.5, and 13.7 g/10 min.

TABLE 13

Invention Runs - Second Embodiment

| | Run 13 | Run 14 | Run 15 |
|---|---|---|---|
| Step 1 | | | |
| Cyclohexane, phm | 168.9 | 168.9 | 168.9 |
| Tetrahydrofuran, phm | .04 | .04 | 0.04 |
| n-Butyllithium initiator, phm | 0.061 | 0.061 | 0.065 |
| Styrene, phm | 40 | 40 | 40 |
| Cyclohexane, phm | 1.1 | 1.1 | 1.1 |
| Peak Polymerization Temperature, °C. | 83 | 83 | 83 |
| Peak Polymerization Pressure, psi | 31 | 32 | 30 |
| Step 2 | | | |
| n-Butyllithium initiator, phm | 0.048 | 0.056 | 0.058 |
| Styrene, phm | 10 | 10 | 10 |
| Cyclohexane, phm | 1.1 | 1.1 | 1.1 |
| Peak Polymerization Temperature, °C. | 81 | 82 | 82 |
| Peak Polymerization Pressure, psi | 35 | 37 | 34 |
| Step 3 | | | |
| Butadiene, phm | 6.9 | 5.9 | 5.9 |
| Styrene, phm | 7.8 | 10 | 10 |
| Cyclohexane, phm | 1.1 | 1.1 | 1.1 |
| Peak Polymerization Temperature, °C. | 110 | 109 | 109 |
| Peak Polymerization Pressure, psi | 57 | 58 | 55 |
| Step 4 | | | |
| Butadiene, phm | 18.1 | 19.1 | 19.1 |
| Styrene, phm | 17.2 | 14.4 | 14.4 |
| Cyclohexane, phm | 1.1 | 1.1 | 1.1 |
| Peak Polymerization Temperature, °C. | 95 | 98 | 97 |
| Peak Polymerization Pressure, psi | 52 | 54 | 50 |
| Polymer Analysis (prior to couping) | | | |
| Mw/Mn, thousands[a] (GPC area composition)[b] | | | |
| Peak 1 | 104/99 (64) | 100/95 (63) | 95/90 (64) |
| Peak 2 | 50/46 (36) | 47/44 (37) | 46/43 (36) |
| Step 5 (Coupling) | | | |
| Vikoflex 7170, phm | 0.4 | 0.4 | 0.4 |
| Cyclohexane, phm | 0.55 | 0.55 | 0.55 |
| Temperature, °C. | 88 | 86 | 88 |
| Pressure, psi | 50 | 52 | 48 |
| Step 6 (Terminating) | | | |
| Water, phm | 0.2 | 0.2 | 0.2 |
| Carbon Dioxide, phm | 0.1 | 0.1 | 0.1 |
| Temperature, °C. | 87 | 87 | 87 |
| Pressure, psi | 50 | 50 | 50 |
| Step 7 (Stabilizing) | | | |
| Stabilizer Mixture, phm | 1.25 | 1.25 | 1.25 |
| Antiblocking agent, phm | 0.3 | 0.3 | 0.3 |
| Recovered Resin Melt Flow, g/10 min | 7.0 | 11.5 | 13.7 |

[a]Polystyrene equivalent Mw/Mn. Mw/Mn of polystyrene with the same hydrodynamic volume as the polymer peak.
[b]Response of a dielectric detector in an Applied Automation process control GPC.

Example VIII

Two comparative polymers (16 and 17) were prepared for comparison with the invention polymers from Example VII.

Polymer 16 was a coupled polymodal styrene/butadiene copolymer containing 75 wt % styrene and 25 wt % butadiene. Polymer 16 was prepared with the sequence i,S,i,S, B/S,i,S,B using monomer charge weight ratios of 37, 19, 7.5/5, 14, 17.5, respectively.

Polymer 17 was a coupled polymodal styrene/butadiene copolymer containing 70 wt % styrene and 30 wt % butadiene. Polymer 17 was prepared with the sequence i,S,i,S, B,i,S,B using monomer charge weight ratios of 37, 19, 9, 14, 21, respectively.

These comparative polymers were prepared in a 380 L reactor according to the procedure in Table 14.

Polymer 16 yielded blends with polystyrene which were made into test specimens that had low blueness and modest physical properties. Polymer 17 formed blends with polystyrene which were made into test specimens that had high blueness and good physical properties.

The flow rates for polymers 16 and 17 were 8.2 and 8.6 g/10 min, respectively.

TABLE 14

Invention Runs - Second Embodiment

| Components[a] | Run 16 | Run 17 |
|---|---|---|
| Step 1 | | |
| Cyclohexane, phm | 168 | 168 |
| Tetrahydrofuran, phm | 0.02 | 0.02 |
| n-Butyllithium initiator, phm | 0.034 | 0.031 |
| Styrene, phm | 37 | 37 |
| Peak Polymerization Temperature, °C. | 88 | 87 |
| Peak Polymerization Pressure, psi | 37 | 36 |
| Step 2 | | |
| n-Butyllithium initiator, phm | 0.048 | 0.053 |
| Styrene, phm | 19 | 19 |
| Peak Polymerization Temperature, °C. | 86 | 85 |
| Peak Polymerization Pressure, psi | 33 | 32 |
| Step 3 | | |
| Butadiene, phm | 7.5 | 9 |
| Styrene, phm | 5 | 0 |
| Peak Polymerization Temperature, °C. | 82 | 83 |
| Peak Polymerization Pressure, psi | 37 | 36 |
| Step 4 | | |
| n-Butyllithium initiator, phm | 0.085 | 0.110 |
| Styrene, phm | 14 | 14 |
| Peak Polymerization Temperature, °C. | 87 | 85 |
| Peak Polymerization Pressure, psi | 41 | 40 |
| Step 5 | | |
| Butadiene | 17.5 | 21 |
| Peak Polymerization Temperature, °C. | 101 | 107 |
| Peak Polymerization Pressure, °C. | 54 | 58 |
| Step 6 (Coupling) | | |
| Vikoflex 7170, phm | 0.4 | 0.4 |
| Temperature, °C. | 89 | 95 |
| Pressure, psi | 51 | 54 |
| Step 7 (Terminating) | | |
| Water, phm | 0.2 | 0.2 |
| Carbon Dioxide, phm | 0.1 | 0.1 |
| Temperature, °C. | 87 | 87 |
| Pressure, psi | 50 | 50 |

TABLE 14-continued

Invention Runs - Second Embodiment

| Components[a] | Run 16 | Run 17 |
|---|---|---|
| Step 8 (Stabilizing) | | |
| Stabilizer Mixture, phm | 1.25 | 1.25 |
| Antiblocking agent, phm | 0.3 | 0.3 |
| Recovered Resin | 8.2 | 8.6 |
| Melt Flow, g/10 min | | |

[a]After each addition of monomer, initiator or additive, the feed lines were rinsed with approximately 5–20 phm cyclohexane diluent and cleared with nitrogen.

Example IX

Polymers from Examples VII and VIII were blended with Novacor® 555 general purpose polystyrene to produce blends 13', 14', 15', 16', and 17' for evaluation. The resulting blend was extruded on an 8.9 cm diameter extruder and sheet line. All blends were 50:50 by weight except for blend 16', which was a 60:40 copolymer:polystyrene by weight blend. A 0.51 mm die gap opening was used for the preparation of a 0.38 mm thick extruded sheet for evaluation.

The extruded sheet samples were evaluated and the results are shown in Table 15. The fold test involves bending the sheet on itself in the machine direction (MD) to induce a transverse directional (TD) break. The sheet is folded at two different rates to allow differentiation between brittle sheet samples. In addition, the behavior of the sheet in response to a tear in machine and transverse directions was determined.

Sheets made from invention blends 13', 14' and 15' all had less blueness than sheets made from comparative blend 17', but more blueness than sheets made from comparative blend 16'.

Sheets made from blend 13' had the highest total energy dart drop value of sheets from this set of blends. Sheets made from blends 14' and 15' had low total energy dart drop values similar to the values of sheets made from blend 16'. Sheets made from comparative blend 16' had the lowest blueness value of any in the group, but bad a low total energy dart drop value and brittle fold test. Sheets made from comparative blend 17' had the highest blueness value and better ductility than invention blends 14' and 15'.

TABLE 15

Physical Properties of Polymer Blends With Polystyrene

| Property | Invention Blend 13' | Invention Blend 14' | Invention Blend 15' | Comparative Blend 16' | Comparative Blend 17' |
|---|---|---|---|---|---|
| Styrene-butadiene copolymer | 13 | 14 | 15 | 16 | 17 |
| Copolymer:Styrene blend ratio | 50:50 | 50:50 | 50:50 | 60:40 | 50:50 |
| Hunter blueness b | −8.0 | −10.0 | −10.1 | −5.7 | −13.5 |
| Haze, % | 2.46 | 2.48 | 2.97 | 1.63 | 3.60 |
| Transmission, % | 89.6 | 89.3 | 89.2 | 89.8 | 88.8 |
| Total energy dart drop, J | 3.17 | 0.80 | 1.11 | 0.95 | 1.61 |
| Transverse direction Fold[a] (fast/slow) | D/D | B/D | B/D | B/B | D/D |
| Machine direction Tear[a] | D | D | D | D | D |
| Transverse direction Tear[a] | D | D | D | D | D |

[a]D = ductile, B = brittle.

These results show that either of the embodiments of the invention can be used in blends with polymers of styrene to produce resins from which can be made articles having low blueness and other properties comparable to or better than the properties of articles made from blends of polymers of styrene with other monovinylaromatic/conjugated diene copolymers. More particularly, a comparison of the 50:50 (copolymer:styrene) invention blends 13', 14' and 15' with the 60:40 (copolymer:styrene) comparative blend 16' shows that a smaller amount of invention copolymer than comparative copolymer can be used to show comparable improvements in reduction of blueness. Other surprising blend properties are demonstrated by these runs. For example, invention blend 13' which had a total of about 75 wt % total styrene in the blend composition had total energy dart drop of 3.17 J compared to a total energy dart drop of 1.61 J for comparative blend 17' which had only about 70 wt % total styrene in the blend composition.

While the polymers and methods of this invention have been described in detail for the purpose of illustration, the inventive polymers and methods are not to be construed as limited thereby. This patent is intended to cover all changes and modifications within the spirit and scope thereof.

That which is claimed is:

1. A method of preparing a polymodal composition wherein said polymodal composition comprises
   coupled tapered block copolymers, where said coupled tapered block copolymers consist of
   S-S-B/S-x-S/B-S-S,
   S-B/S-x-S/B-S, and
   S-S-B/S-x-S/B-S copolymers, and where said coupled tapered block copolymers are substantially the only coupled tapered block copolymers in said polymodal composition said method comprises:
   (a) charging a monovinylaromatic monomer and an initiator and in the presence of a randomizer, allowing polymerization to occur until essentially no free monomer is present, to produce and S-Li block; thereafter
   (b) charging an initiator and a monovinylaromatic monomer, and allowing polymerization to occur until essentially no free monomer is present, to produce S-S-Li and S-Li blocks; thereafter
   (c) charging a mixture of monovinylaromatic monomer and conjugated diene monomer, and allowing polymerization to occur until essentially no free monomer is present, to produce S-S-B/S-Li and S-B/S-Li blocks; thereafter (d) charging the reaction mixture with a coupling agent to form said coupled tapered block copolymers wherein S=monovinylaromatic block B=conjugated diene block B/S=tapered block of conjugated diene/monovinylaromatic compound Li=living polymer site or coupling site and x=coupling agent.

2. A method according to claim 1 wherein each said monovinylaromatic monomer contains 8 to 12 carbon atoms and each said conjugated diene contains 4 to 6 carbon atoms, said monomers being added in a ratio of about 60 to about 90 weight percent monovinylaromatic monomer and about 10 to about 40 weight percent conjugated diene monomer.

3. A method according to claim 2 wherein each said monovinylaromatic monomer contains 8 to 12 carbon atoms and each said conjugated diene contains 4 to 6 carbon atoms, said monomers being added in a ratio of about 65 to about 85 weight percent monovinylaromatic monomer and about 15 to about 35 weight percent conjugated diene monomer.

4. A method according to claim 3 wherein the weight ratio of the amounts of said monovinylaromatic monomer and said conjugated diene monomer in step (c) is within the range of 1:0.63 to 1:2.

5. A method according to claim 4 wherein the weight ratio of said monovinylaromatic monomer and said conjugated diene monomer in step (c) is within the range of about 1:0.67 to about 1:1.8.

6. A method according to claim 5 wherein the weight ratio of said monovinylaromatic monomer and said conjugated diene monomer in step and (c) is within the range of about 1:0.8 to about 1:1.5.

7. A method according to claim 6 wherein said monovinylaromatic monomer charged in step (a) is from 20 to 60 parts by weight per hundred parts by weight of total monomers charged in said method; and wherein said monovinylaromatic monomer charged in step (b) is from about 4 to about 16 parts by weight per hundred parts by weight of total monomers charged in said method; and wherein said monovinylaromatic monomer charged in step (c) is from about 5 to about 45 parts by weight per hundred parts by weight of total monomers charged in said method.

8. A method according to claim 7 wherein said monovinylaromatic monomer charged in step (a) is from about 30 to about 50 parts by weight per hundred parts by weight of total monomers charged in said method; and wherein said monovinylaromatic monomer charged in step (b) is from about 6 to about 14 parts by weight per hundred parts by weight of total monomers charged in said method; and wherein said monovinylaromatic monomer charged in step (c) is from about 20 to about 30 parts by weight per hundred parts by weight of total monomers charged in said method.

9. A method according to claim 8 wherein said monovinylaromatic monomer charged in step (a) is from about 35 to about 45 parts by weight per hundred parts by weight of total monomers charged in said method; and wherein said monovinylaromatic monomer charged in step (b) is from about 8 to about 12 parts by weight per hundred parts by weight of total monomers charged in said method; and wherein said monovinylaromatic monomer charged in step (c) is from about 22 to about 28 parts by weight per hundred parts by weight of total monomers charged in said method.

10. A method according to claim 9 wherein said initiator in steps (a) and (b) is charged in amounts effective to provide proportionate amounts of polymeric species in said polymodal composition such that articles made from blends of said polymodal composition with polymers of styrene have improved impact strength.

11. A method according to claim 9 wherein said initiator in steps (a) and (b) is charged in amounts effective to provide proportionate amounts of polymeric species in said polymodal composition such that articles made from blends of said polymodal composition with polymers of styrene have low blueness.

12. A method according to claim 9 wherein said initiator in steps (a) and (b) is charged in amounts effective to provide polymodal composition having a melt flow in the range from 2 to 50 g/10 min.

13. A method according to claim 9 wherein said initiator in step (b) is present in an amount at least equal to the amount of said initiator in step (a).

14. A method according to claim 9 wherein the amount of initiator in step (b) is from about 0.3 to about 10 times as much, based on weight, as the amount of initiator in step (a).

15. A method according to claim 9 wherein each said conjugated diene monomer is 1,3-butadiene, each said monovinylaromatic monomer is styrene, said initiator is n-butyllithium, said randomizer is selected from the group consisting of tetrahydrofuran, diethyl ether, and mixtures thereof, and said coupling agent is epoxidized vegetable oil.

16. Polymodal copolymers produced in accordance with the method of claim 1.

17. Articles made from the copolymer of claim 16.

18. A polymodal composition that comprises coupled tapered block copolymers, wherein said coupled tapered block copolymers consist of S-S-B/S-x-S/B-S-S S-B/S-x-S/B-S, S-S-B/S-x-S/B-S copolymers, and wherein S=monovinylaromatic block B=conjugated diene block B/S=tapered block of monovinylarene and conjugative diene x=coupling agent and wherein said coupled tapered block copolymers are substantially the only coupled tapered block copolymers in said polymodal composition.

19. A polymodal composition as recited in claim 18 having from about 60 to about 90 weight percent polymerized monovinylaromatic monomer based on total weight of monomers in said polymodal composition.

20. A polymodal composition as recited in claim 19 having from about 65 to about 85 weight percent polymerized monovinylaromatic monomer based on total weight of monomers in said polymodal composition.

21. Articles made from the copolymer of claim 18.

* * * * *